(12) United States Patent
Kuznetsov

(10) Patent No.: US 9,531,289 B2
(45) Date of Patent: Dec. 27, 2016

(54) ELECTRO-MECHANICAL KINETIC ENERGY STORAGE DEVICE AND METHOD OF OPERATION

(75) Inventor: Stephen B. Kuznetsov, Framingham, MA (US)

(73) Assignee: RAYTHEON COMPANY, Waltham, MA (US)

( * ) Notice: Subject to any disclaimer, the term of this patent is extended or adjusted under 35 U.S.C. 154(b) by 1024 days.

(21) Appl. No.: 13/458,586

(22) Filed: Apr. 27, 2012

(65) Prior Publication Data

US 2013/0285491 A1 Oct. 31, 2013

(51) Int. Cl.

| | |
|---|---|
| H02K 11/00 | (2016.01) |
| H02M 5/48 | (2006.01) |
| H02P 25/22 | (2006.01) |
| H02J 3/30 | (2006.01) |
| H02K 7/02 | (2006.01) |
| H02J 15/00 | (2006.01) |
| H02K 3/28 | (2006.01) |

(52) U.S. Cl.
CPC ............... *H02M 5/48* (2013.01); *H02J 3/30* (2013.01); *H02J 15/00* (2013.01); *H02K 7/025* (2013.01); *H02P 23/26* (2016.02); *H02P 25/22* (2013.01); *H02K 3/28* (2013.01); *Y02E 60/16* (2013.01)

(58) Field of Classification Search
CPC .......... H02P 25/22; H02P 23/008; H02J 3/30; H02J 15/00; H02K 7/025; H02K 3/28; H02M 5/48; Y02E 60/16
USPC ...................................................... 307/18, 67
See application file for complete search history.

(56) References Cited

U.S. PATENT DOCUMENTS

| | | | | | |
|---|---|---|---|---|---|
| 1,646,823 | A | * | 10/1927 | Karapetoff | ................ H02P 9/24 322/19 |
| 2,149,082 | A | * | 2/1939 | Buell | ..................... H02K 17/30 307/102 |
| 2,740,510 | A | * | 4/1956 | Berthold | ............... B21C 47/003 188/181 A |

(Continued)

FOREIGN PATENT DOCUMENTS

EP 0849170 6/1998

OTHER PUBLICATIONS

Limpaecher, et al. "Resonant Link PFN Charger and Modular Power Supply" Science Application International Corporation Electrical Power Technology Division, IEEE, 2007; pp. 1495-1499.

(Continued)

*Primary Examiner* — Rexford Barnie
*Assistant Examiner* — Elim Ortiz

(57) ABSTRACT

An electro-mechanical kinetic energy storage device includes an input port, an output port, and a tertiary port separate from and magnetically coupled to the input port and the output port. The input port is configured to receive a first input electrical energy from a first electrical source for inducing mechanical energy into the electro-mechanical kinetic energy storage device. The output port is configured output a first converted electrical energy to a first load in which the outputted electrical energy is generated from the induced mechanical energy. The tertiary port is configured to receive a second input electrical energy from a second electrical source for inducing the mechanical energy, and output a second converted electrical energy to a second load, the second converted electrical energy generated from the induced mechanical energy.

20 Claims, 9 Drawing Sheets

(56) References Cited

U.S. PATENT DOCUMENTS

| | | | |
|---|---|---|---|
| 3,024,298 A | 7/1958 | Goitsos et al. | |
| 3,004,381 A * | 10/1961 | Schweitzer, Jr. | G04C 13/027 310/111 |
| 3,183,481 A | 5/1965 | Ford | |
| 3,187,250 A * | 6/1965 | Born | H02P 29/0016 322/32 |
| 3,315,148 A * | 4/1967 | Grillo | H02J 3/30 290/4 R |
| 3,452,229 A * | 6/1969 | Pimlott, Jr. | H02K 19/24 310/168 |
| 3,571,693 A | 3/1971 | Riaz | |
| 3,667,012 A * | 5/1972 | Kilgore | H02P 27/05 318/161 |
| 4,001,666 A * | 1/1977 | Grenfell | H02J 3/30 310/74 |
| 4,011,535 A | 3/1977 | Kosky et al. | |
| 4,048,603 A | 9/1977 | Staub et al. | |
| 4,393,964 A * | 7/1983 | Kemper | B60K 6/105 192/3.58 |
| 4,439,720 A * | 3/1984 | Georges | H02K 7/025 290/4 R |
| 4,444,444 A * | 4/1984 | Benedetti | F16C 32/0442 310/90.5 |
| 4,612,494 A | 9/1986 | Kawamura | |
| 4,926,107 A | 5/1990 | Pinson | |
| 4,971,522 A * | 11/1990 | Butlin | E21B 43/127 318/808 |
| 5,097,194 A * | 3/1992 | Walton | H02J 7/1423 307/66 |
| 5,646,458 A * | 7/1997 | Bowyer | H02J 9/066 290/4 A |
| 5,921,505 A | 7/1999 | Spector | |
| 6,023,152 A * | 2/2000 | Briest | B30B 15/148 307/67 |
| 6,078,119 A * | 6/2000 | Satoh | F16C 32/0444 310/179 |
| 6,239,513 B1 | 5/2001 | Dean et al. | |
| 6,573,626 B1 * | 6/2003 | Gosebruch | H02J 9/066 290/30 A |
| 6,710,579 B2 * | 3/2004 | Ebel | F02N 5/04 310/74 |
| 7,663,328 B2 | 2/2010 | Gonder | |
| 7,710,081 B2 | 5/2010 | Saban et al. | |
| 2005/0012395 A1 | 1/2005 | Eckroad et al. | |
| 2008/0103632 A1 | 5/2008 | Saban et al. | |
| 2009/0134705 A1 * | 5/2009 | Kalev | H02K 7/025 307/68 |
| 2011/0084568 A1 | 4/2011 | Lateb et al. | |
| 2012/0187922 A1 | 7/2012 | Dubois et al. | |
| 2012/0286523 A1 | 11/2012 | Hull et al. | |
| 2013/0020893 A1 | 1/2013 | Bradley et al. | |
| 2013/0127391 A1 | 5/2013 | Lewis | |
| 2013/0257186 A1 | 10/2013 | Kozar et al. | |
| 2013/0260999 A1 | 10/2013 | Hull et al. | |
| 2013/0261001 A1 | 10/2013 | Hull et al. | |
| 2013/0285491 A1 | 10/2013 | Kuznetsov | |
| 2014/0346868 A1 * | 11/2014 | Kuznetsov | H02J 4/00 307/18 |

OTHER PUBLICATIONS

Kuznetsov, S.; U.S. Patent Application entitled "Inertial Energy Storage System and Hydro-Fluoro-Ether Power Transformer Scheme for Radar Power Systems and Large: PFN Charging"; U.S. Appl. No. 14/245,754; filed Apr. 4: 2014, 54 pages.

Kuznetsov, S.; U.S. Patent Application entitled "Method and Apparatus for Control of Pulsed Power in Hybrid Energy Storage Module", U.S. Appl. No. 14/591,695, filed Jan. 7, 2015: 47 pages.

Kuznetsov, S.; U.S. Patent Application entitled "System and Method for Parallel Configuretion of Hybrid Energy Storage Module", U.S. Appl. No. 14/711,632, filed May 13, 2015, 55 pgs.

International Search Report and Written Opinion issued for PCT/US2016/012513, dated May 30, 2016, 11 pgs.

L.A. Kilgore et al., "Energy Storage At Site Permits Use of Large Excavators On Small Power Systems", Westinghouse Engineer, Nov. 1970, vol. 30 No. 6, pp. 162-167.

International Search Report and Written Opinion issued for PCT/US2015/017264, dated Sep. 2, 2015, 5 pgs.

Narbut, et al.; "Vaporization Cooling for Power Tranformers" Transaction of the AIEE, Power Apparatus & Systems, Part III; Dec. 1959; 7 pages.

Moore, et al.: "Design and Performace Characteristics of Gas/Vapor Transformers"; Trans. IEEE; Power Apparatus & Systems; vol. PAS-101; Jul. 1982; 4 pages.

Mike Strasik, "Flywheel Electricity Systems with Superconducting Bearnings for Utility Applications," Boeing Phantom Works, Jul. 28, 2004, 32 pages.

Walls, W.A., "Rotating machines for poised power", IEEE Xplore Abstract, Conference Record of the 25th International Symposium and 2002 High-voltage Workshop, Jun. 30-Jul. 3, 2002, 6 pages, IEEE, New York, N.Y.

3M Electronics, Product Information, "3M Novec 649 Engineered Fluid", <URL:http://solutions.3mmagyar.hu/3MContentRetrievalAPI/BiobServlet?Imd=1351678101000&locale=hu_HU&assetType=MMM_Image&assetId=1319241050803&blobAttribute=ImageFile>, Sep. 9, 2009, 4 pages.

\* cited by examiner

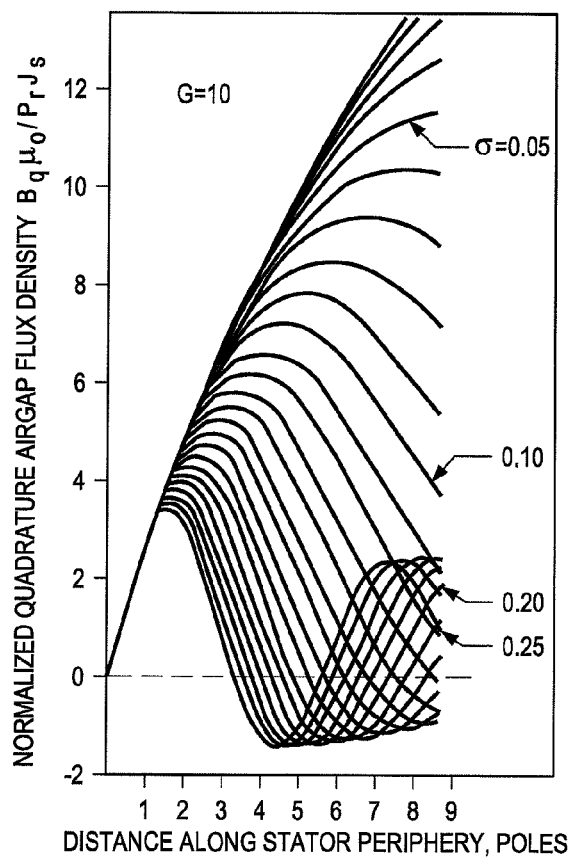
FIG. 6A
FIG. 6B
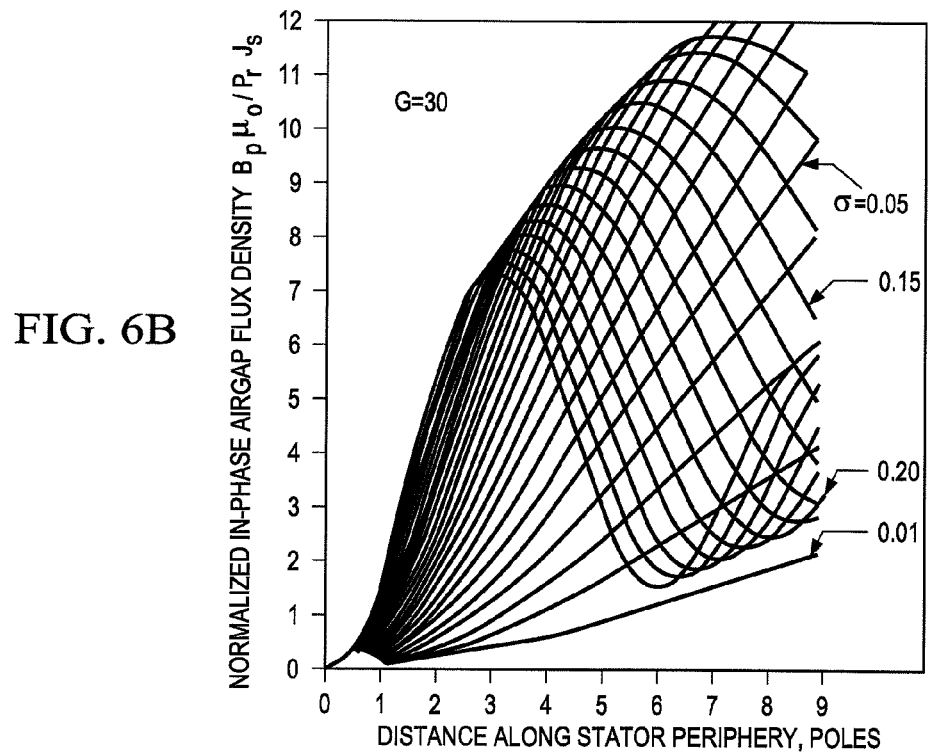

ELECTRO-MECHANICAL KINETIC ENERGY STORAGE DEVICE AND METHOD OF OPERATION

TECHNICAL FIELD

The present disclosure is directed in general to energy storage devices, and more specifically to an electro-mechanical kinetic energy storage device and method of operation.

BACKGROUND OF THE DISCLOSURE

Electrical energy may be stored in various forms, such as batteries that undergo a chemical reaction, capacitors that build an electric charge field, and electrical machine driven flywheels that store the electrical energy as kinetic energy. Electrical machines may be particularly suitable for large loads due to the relatively large levels of kinetic energy that may be stored in the rotating flywheels. In particular, electrical machines have been developed as variable speed drives for such loads as servo motors and propulsion motors that typically expend large amounts of energy in a relatively short period of time.

Electrical machines often adversely affect the power factor of the electrical source from which they are driven. Additionally, these electrical machines may generate relatively strong transient voltages that may be injected back into the source when short bursts of energy from the electrical machine are consumed. To alleviate this problem, the electrical machine can be configured with multiple ports for which one or more ports are used for real power bidirectional flow or energy storage and at least one port is used as a source or sink of reactive power that can correct for input power factor, to provide additional filtering of the load or to provide additional filtering and voltage regulation of the source.

SUMMARY OF THE DISCLOSURE

To address one or more of the above-deficiencies and/or other deficiencies in prior art, this disclosure provides an electro-mechanical kinetic energy storage device and method of operation.

According to an embodiment of the disclosure, an electro-mechanical kinetic energy storage device includes an electrical machine having an input port, an output port, and a tertiary port separate from and magnetically coupled to the input port and the output port. The input port is configured to receive or inject a first input electrical energy to and from a first electrical source for inducing mechanical energy into the electro-mechanical kinetic energy storage device. The output port is configured to inject or receive a first converted electrical energy to a first load in which the outputted electrical energy is generated from the induced mechanical energy. The tertiary port is configured to receive and inject a second input electrical energy from a second electrical sink or source for conversion to mechanical energy, and transfer a second converted electrical energy to the input port or output port, the second converted electrical energy generated in whole or in part from the induced mechanical energy. In a particular embodiment, the mechanical energy may be stored in a rotating inertial mass coupled to the electrical machine.

Certain embodiments may provide various technical advantages depending on the implementation. For example, a technical advantage of some embodiments may include enhanced pulse generation energy by the use of tertiary electrical windings that provide improved power factor and transfer efficiency than other known electro-mechanical kinetic energy storage devices. Another advantage that may be provided by certain embodiments of the present disclosure is the existence of a counter electro-motive force (EMF) that is proportional to the product of field current and shaft speed in the synchronous machine. This feature may be important because the counter-EMF may help to commutate certain electrical switching devices such as thyristors and provide for the use of high voltage naturally commutating thyristors which are well suited for use with high power systems.

One particular advantage may include the ability of the main output port to deliver polyphase power at an impedance level and a particular discharge rate different from the tertiary port as each port may feed substantially different loads and thus each port provides a unique L/R time constant, impedance level or voltage to match the respective loads.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which:

FIGS. 6A and 6B show example in-phase radial flux density waveforms as Bp in the airgap of a high speed electrical machine and the corresponding quadrature flux density waveform as Bq that may be exhibited in certain embodiments of the present disclosure;

DETAILED DESCRIPTION

FIGS. 1 through 9, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system. Additionally, the drawings are not necessarily drawn to scale.

Figure 1:
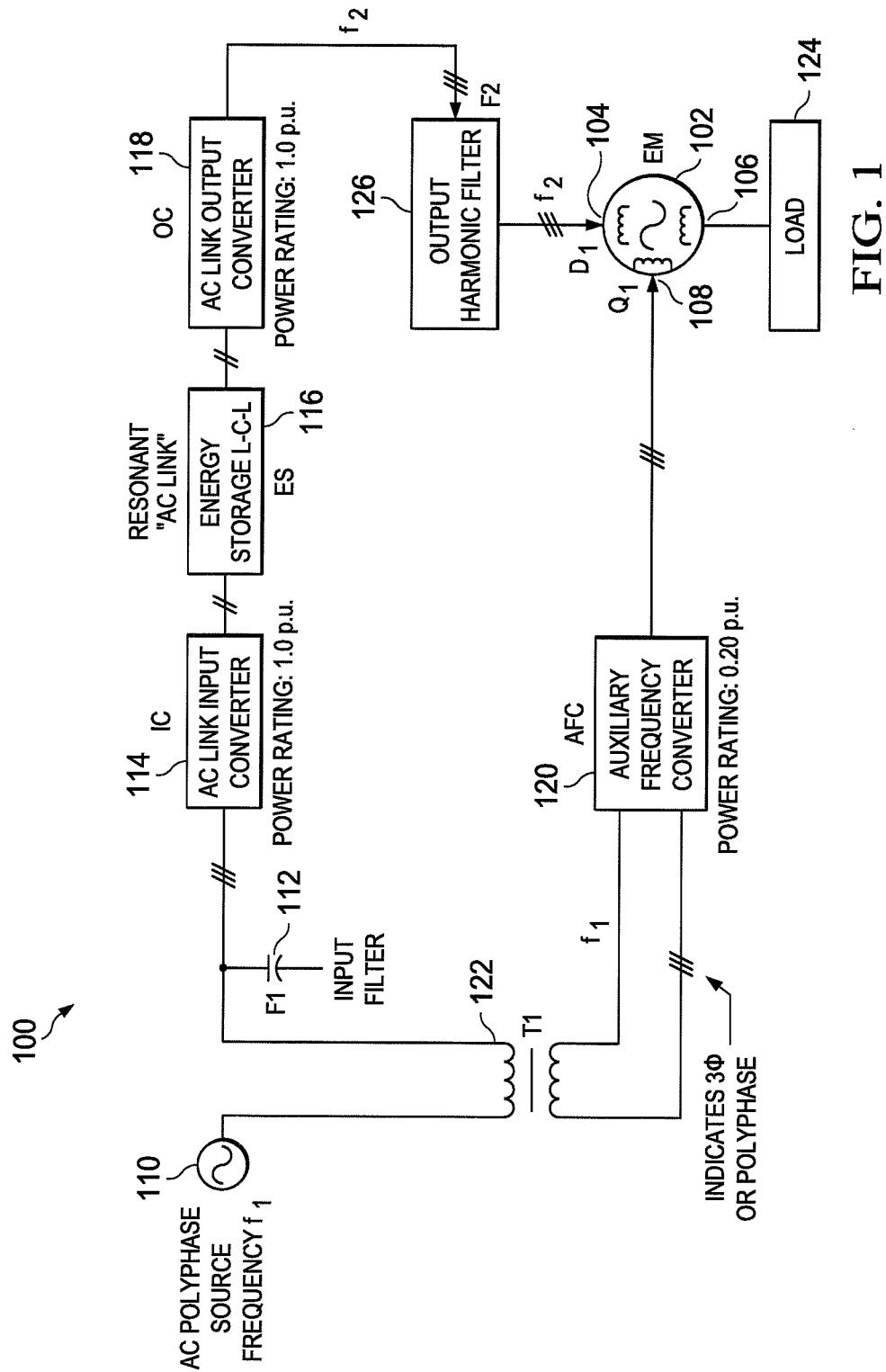
FIG. 1 illustrates an example electro-mechanical energy storage system according to one embodiment of the teachings of the present disclosure.

FIG. 1 illustrates an example electro-mechanical energy storage system 100 according to one embodiment of the present disclosure. The electro-mechanical energy storage system 100 includes an electro-mechanical kinetic energy storage device 102 having an input port 104, an output port 106, and a tertiary port 108. The input port 104 is coupled to an electrical source 110 through an input filter 112, an AC link input converter (IC) 114, a resonant energy storage apparatus 116, an AC link output converter (OC) 118, and an output filter 126. The tertiary port 108 is coupled to the electrical source 110 through an auxiliary frequency converter (AFC) 120 and an isolation transformer 122. The output port 106 is coupled to a load 124, which in this particular example, may be a device, such as a pulsed laser device, a railgun (electro-magnetic launcher), or a pulsed radar device that uses short bursts of electricity at relatively high energy levels.

The particular electro-mechanical energy storage system 100 as shown combines the function of the input filter of conventional variable speed drives into the electro-mechanical kinetic energy storage device 102 through the use of the AFC 120 that may function at a fraction of the power rating of the IC 114, energy storage apparatus 116, and OC 118 combination. The AFC 120 provides series power injection, using the tertiary port 108, for impedance matching the electro-mechanical kinetic energy storage device 102 with the electrical source 110. In certain embodiments, the enhanced impedance matching may therefore, allow relatively smaller filtering components than what has been previously accomplished using conventional topologies.

The isolation transformer 122 has both leakage reactance and relatively high magnetic coupling to machine reactive windings Q1 coupled to tertiary port 108 through auxiliary frequency converter AFC 120. The input filter 112 includes a relatively small bank of polyphase capacitors that may be coupled together in a delta configuration. The output filter 126 may be configured as a polyphase inductive-capacitive (L-C) network. In certain configurations, the value of components used in the output filter 126 may be dependent upon anticipated power factor provided by the power source 110 or the output load 124. In another embodiment, the auxiliary frequency converter 120 may be programmed as an adjustable phase shifter providing polyphase excitation through transformer 122 back to the source for the purpose of correcting power factor and injecting into the source 110 excess VARs that may be available from the electrical machine windings 108 attached to the kinetic energy storage device 102. In a particular operating cycle when the output load 124 is light or non-existent, the electrical machine windings 108 will have excess leading VARs which can be regulated in phase angle and in magnitude by the AFC 120 acting as a phase shifter comprising a solid state apparatus with electronic switching devices such as thyristors, IGCTs or IGBTs. The windings 108 constitute a reactive port that allows reactive power to flow either into or out of the electrical machine. FIG. 1 shows a series injection scheme through transformer 122 but it should be clear to anyone skilled in the art that a parallel injection of VARs from auxiliary frequency converter 120 operating as a phase shifting apparatus with VARs generated by device 102 into the source 110 is also viable.

The electro-mechanical kinetic energy storage device 102 is an alternating current (AC) rotating electrical machine having an input port 104 with an electrical winding coupled to the electrical source 110, an output port with a winding coupled to the load 124, and a specially wound tertiary port with a winding configured in a quadrature (Q-axis) design that absorbs or regulates the time transients and input harmonics generated at a frequency f1. The tertiary port 108 may operate at any frequency f2 that is independent of frequency f1. The electro-mechanical kinetic energy storage device 102, therefore, may be considered to have two independent stator windings that function at two differing electrical frequencies. The direct axis (D-axis) winding associated with the input port 104 may or may not provide mechanical torque. This input winding and the winding associated with the tertiary port 108 may be wound for different or similar voltage levels. They are magnetically coupled through the rotor structure and to a lesser extent these windings are generally loosely coupled through the stator structure but with relatively high dielectric isolation. The electro-mechanical energy storage system 100 of FIG. 1 may apply to salient pole synchronous machines, asynchronous induction machines, and brushless direct current (DC) machines.

The AFC 120 generally includes a reduced size and reduced capacity frequency converter that resembles the main AC link converter in its frequency range such that it tracks the high frequency f2. In some cases, the AFC 120 may provide reactive power at a different phase angles than may be provided through the IC 114, energy storage apparatus 116, and OC 118 combination. The AFC 120 as shown is a current-source inverter and rated at approximately 10 to 30 percent of the power rating of the combined power rating to the IC 114, energy storage apparatus 116, and OC 118. Additionally, the AFC 120 may or may not use an AC link circuit topology.

Figure 2A:
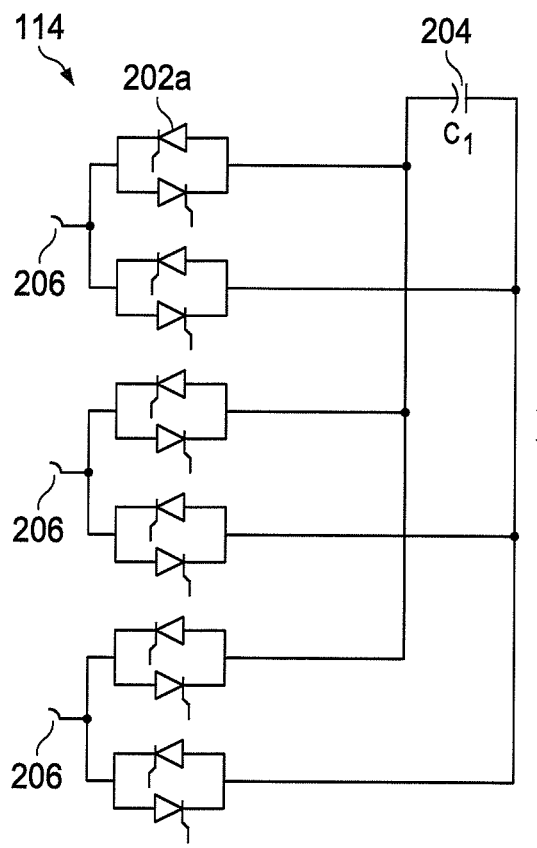
FIGS. 2A through 2C illustrate an example AC link input converter (IC), a resonant energy storage apparatus, and an AC link output converter (OC), respectively, that may be used with the electro-mechanical energy storage system as shown in FIG. 1.
Figure 2B:
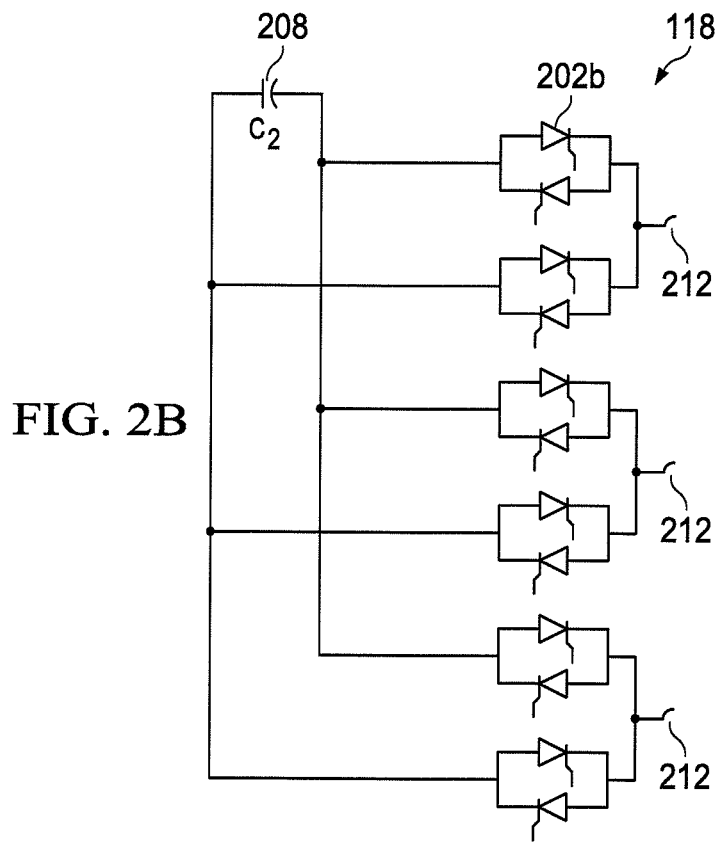
Figure 2C:
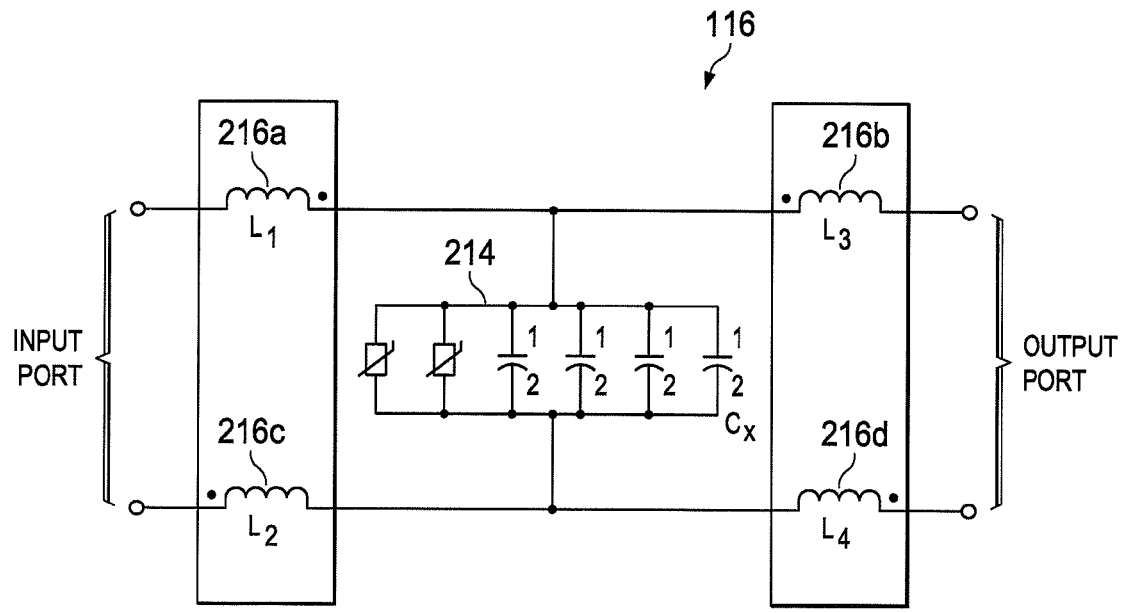

FIGS. 2A through 2C illustrate an example IC 114, energy storage apparatus 116, and OC 118, respectively, that may be used with the electro-mechanical energy storage system 100 as shown in FIG. 1. As shown in FIG. 2A, the example IC 114 includes multiple solid-state switches 202a that selectively couple inputs of the electrical source, which in this particular example is a three-phase electrical source, to a capacitor 204. This particular configuration allows the three-phase electrical source to be converted to a single-phase source having any desired frequency according to voltage signals applied to the inputs 206 of the solid-state switches 202a. The single-phase source in this particular example may be a high-frequency source operating at approximately 600 Hertz. In other embodiments, the high-frequency source may be less than 600 Hertz or greater than 600 Hertz. In one embodiment, the solid-state switches 202a include thyristors. In other embodiments, the solid-state switches 202a may include any suitable type of solid-state switching device, such as integrated gate commutated thyristors (IGCT) or insulated gate bipolar transistors (IGBT) that are commonly used for relatively high power applications.

As shown in FIG. 2B, the example OC 118 includes multiple solid-state switches 202b that selectively couple an input capacitor 208 to a three-phase output line 212. This particular configuration allows a high-frequency source present on the capacitor 208 to be converted to a three-phase source having any desired frequency according to voltage signals applied to the inputs of the solid-state switches 202b. As may be seen, the OC 118 operates in a complementary manner to the IC 114 of FIG. 2A in which the high-frequency source present on the capacitor 204 is converted to a three-phase output having a frequency of approximately 60 Hertz. In other embodiments, the three-phase output may be less than 60 Hertz or greater than 60 Hertz.

As shown in FIG. 2C, the example energy storage apparatus 116 is configured between the IC 114 and the OC 118 and includes several energy storage elements, namely capacitors 214 and inductors 216a, 216b, 216c, and 216d that may be used to temporarily store electrical energy. The energy storage apparatus 116 includes input mutually coupled inductors 216a and 216c on the input of the energy storage apparatus 116, and output mutually coupled inductors 216b and 216d on the output of the energy storage apparatus 116. The inductors 216a, 216b, 216c, and 216d have equivalent inductance values relative to one another. The input mutually coupled inductors 216a and 216c are phased in boost arrangement for input-port current, such as a Brooks coil pair. The output mutually coupled inductors 216b and 216d are also phased in boost arrangement for output-port current in a similar manner in which the input mutually coupled inductors 216a and 216c are coupled.

Figure 3:
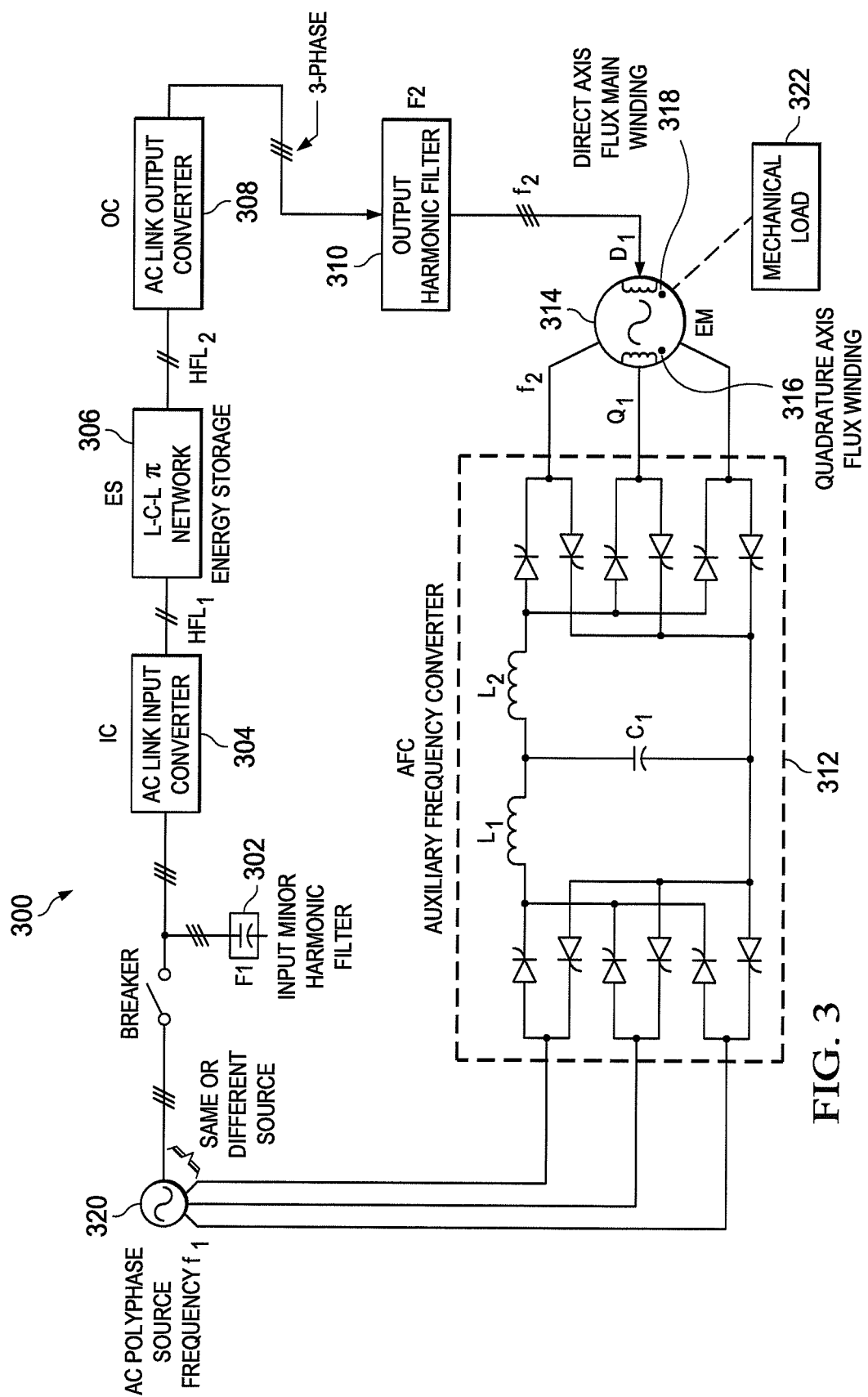
FIG. 3 illustrates an example electro-mechanical energy storage system according to another embodiment of the present disclosure.

FIG. 3 illustrates an example electro-mechanical energy storage system 300 according to another embodiment of the present disclosure. The electro-mechanical energy storage system 300 includes an input filter 302, an IC 304, an ES 306, an OC 308, an output filter 310, an auxiliary frequency converter (AFC) 312, a load 322 and an electro-mechanical kinetic energy storage device 314 that are similar in design and construction to the input filter 112, IC 114, energy storage apparatus 116, OC 118, output filter 126, AFC 120, load 124, and electro-mechanical kinetic energy storage device 102 as shown in FIGS. 1 through 2C. The electro-mechanical energy storage system 300 differs, however, in that the isolation transformer 122 of FIG. 1 has been eliminated and the electrical source 320 is directly applied to the AFC 312. Elimination of the isolation transformer may be desirable in high density systems and may reduce the overall size and/or weight of the electro-mechanical energy storage system 300 in some embodiments. In this configuration, the AFC 312 operates at the line potential of the electrical source 320; however, the output of the AFC 312 feeds the tertiary winding of the electro-mechanical kinetic energy storage device 314, which is isolated, and permits reactive control currents to be at voltages distinct and different from the main excitation voltages applied to the input winding of the electro-mechanical kinetic energy storage device 314.

Both the AFC 312 and the IC 304 are bi-directional power converters and use a minimum of 12 solid-state switches for a three-phase system as shown. In other embodiments, other quantities of solid-state switches may be used with a different electrical source having other quantities of phases. For example, both the AFC 312 and the IC 304 may each use 24 solid-state switches for a six-phase electrical source. The reactive inductive and capacitive filter elements in the AFC 312 may be reduced in size compared to similar reactive and capacitive elements in the main energy storage network (e.g., IC 304, ES 306, and OC 308), input filter 302, or output filter 310. High frequency AC link output power HFL1 is generated by IC 304 and provided as an input to ES 306. The ES 306 generates a high frequency polyphase output power HFL2 that is inputted to the OC 308.

Figure 4:
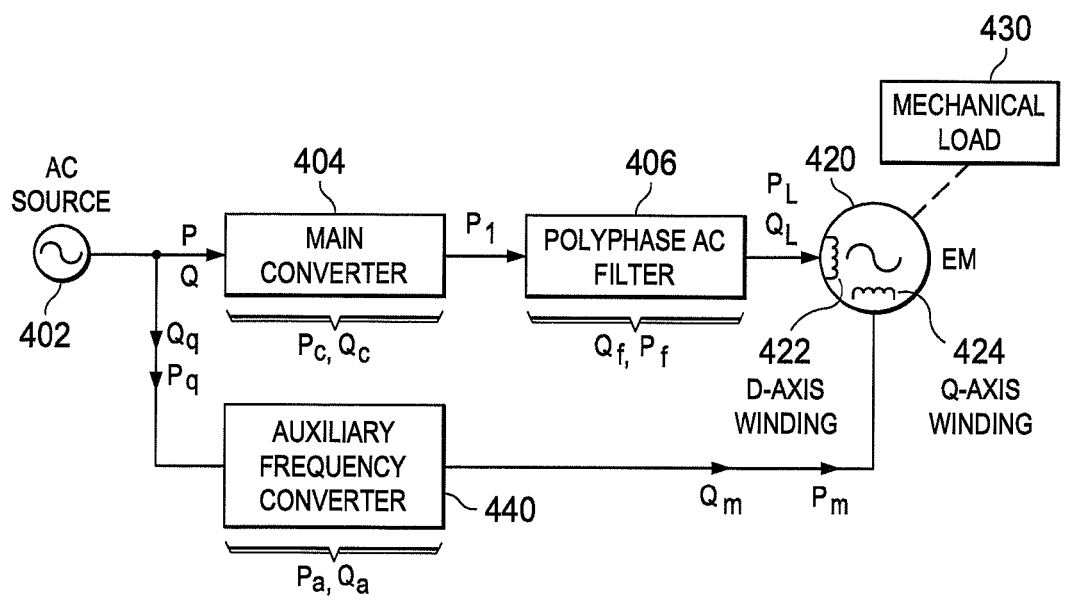
FIG. 4 illustrates an example electro-mechanical energy storage system showing real and reactive power flow with a electro-mechanical kinetic energy storage device having a tertiary electrical winding configured in quadrature relative to other electrical windings according to another embodiment of the present disclosure.

FIG. 4 illustrates an example electro-mechanical energy storage system 400 showing real and reactive power flow with an electro-mechanical kinetic energy storage device having a tertiary winding configured in quadrature relative to other windings according to another embodiment of the present disclosure.

As shown in FIG. 4, Real power provided by the electrical source may be represented by:

$$P = P_c + P_f + P_L$$

Reactive power provided by the electrical source may be represented by:

$$Q = Q_c + Q_f + Q_L$$

Thus, the electrical source apparent power may be calculated according to:

$$S = \sqrt{P^2 + Q^2}$$

For the auxiliary line feeding the quadrature flux machine axis:

$$P_q = P_a + P_m$$

$$Q_q = Q_a + Q_m$$

Thus, the apparent power through the AFC may be calculated according to:

$$S_Q = \sqrt{P_q^2 + Q_q^2}$$

The main converter (IC 304, ES 306, and OC 308) has reactive power loss Qc and the output filter has reactive power loss Qf and real power loss Pf. The auxiliary converter AFC 312 has real power loss Pa and reactive power loss Qa in its internal components. However both main reactive power Qm and main real power Pm can be negative or positive depending on the electrical machine spatial transient control allowing the quadrature reactance Qq or real power reactance Pq to be positive or negative. In the electro-mechanical energy storage system 400, real power reactance Pq, real power loss Pa, and main real power Pm are kept relatively low. Also, the main reactive power Qm may be optimized to be a minimum for a given power rating of load power $P_L$, thereby minimizing the apparent power and minimizing system weight.

A rotary induction machine can be specially wound to have a reactive power generating winding that capitalizes on the quadrature axis flux not normally present in a symmetrical induction machine. The electro-mechanical energy storage system as shown in FIGS. 1 and 3 may use a cage-rotor induction machine with a "tertiary" winding located in periodically spaced stator slots which creates a space transient effect when loaded. This space transient establishes a new means of generating reactive energy from the airgap flux that is not due to leakage or magnetizing fluxes.

The space transient effect in the electrical machine can be created by two general mechanisms: i) a physical space transient in a polyphase stator as a function of airgap periphery and airgap magnetic reluctance change as a function of periphery, or ii) a heavily loaded segment of stator winding in each phase group whereby the magnetic permeability of the selected stator segments is significantly reduced causing periodic perturbations in the typically uniform airgap flux pattern.

Figure 5:
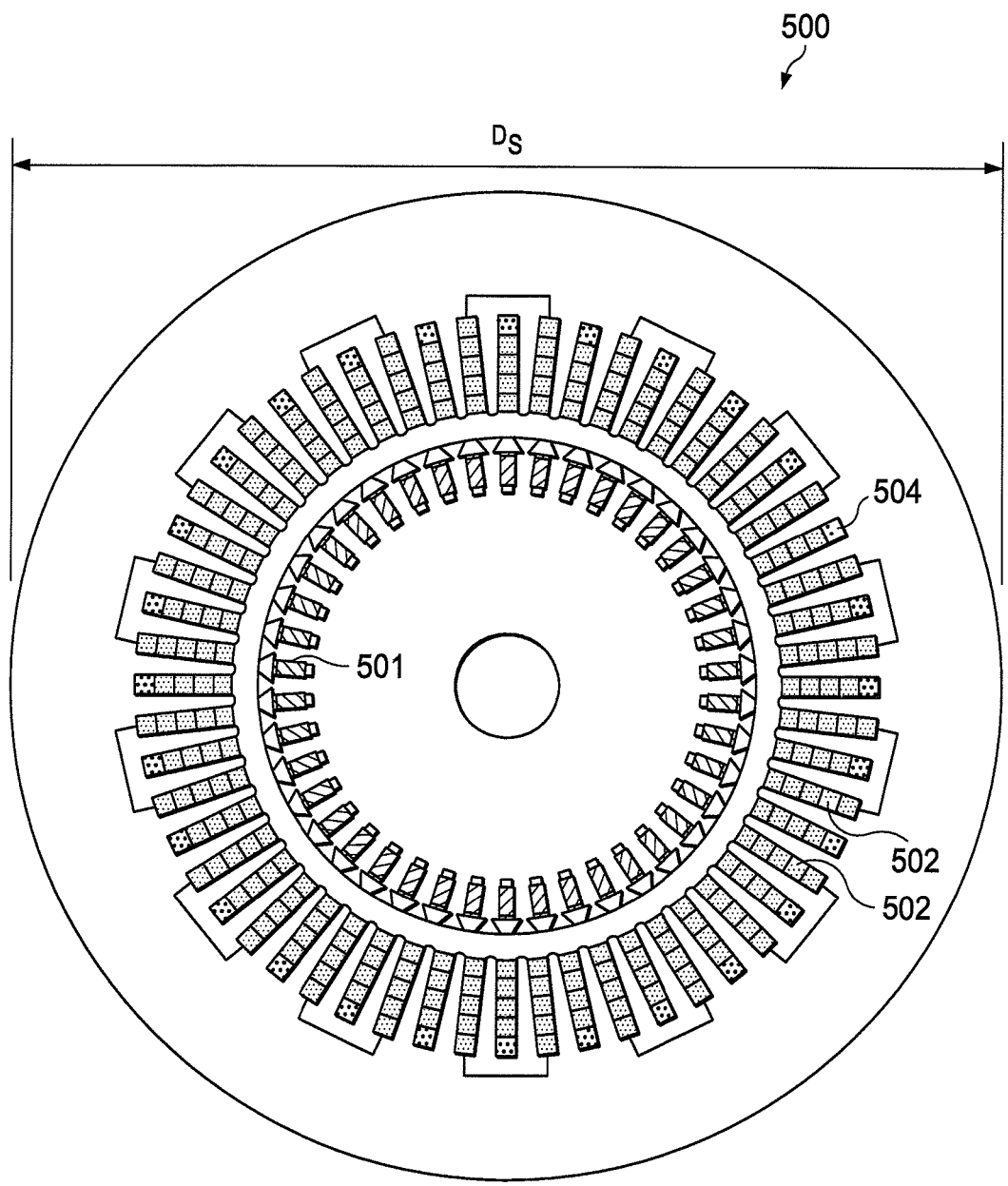
FIG. 5 illustrates an example electro-mechanical kinetic energy storage device according to another embodiment of the present disclosure.

FIG. 5 illustrates an example electro-mechanical kinetic energy storage device 500 according to one embodiment of the present disclosure. The electro-mechanical kinetic energy storage device 500 as shown is an induction machine with a cage type rotor having a symmetrical layout of rotor conductors 501 and a dual wound polyphase stator member with a main direct-axis (D-axis) input winding 502 shown in all of the available slots and a quadrature-axis (Q-axis) tertiary winding 504 shown in every other available slot and having a limited slot depth. The magneto-motive force (MMF) ratio of the D-axis to the Q-axis winding in this particular example is 9:1. Other embodiments of the electro-mechanical kinetic energy storage device 500 may have magneto-motive force (MMF) ratios of their D-axis to their Q-axis stator windings less than 9:1 or greater than 9:1. The same stator structure may also apply to an induction machine with a cast copper, brass, or cast aluminum rotor conductor. The D-axis and Q-axis windings are configured in a polyphase arrangement and electrically insulated to provide high dielectric voltage isolation from one another. The D-axis and Q-axis windings have different impedance levels and can be wound for the same or different voltage levels.

FIGS. 6A and 6B illustrate example plots of the in-phase (Bp) and quadrature (Bq) magnetic flux waveforms in a specially wound cage-rotor electrical induction machine according to one embodiment of the present disclosure. The in-phase and quadrature magnetic flux waveforms are plotted as a function of the design parameter σG where σ is the per unit slip and G is the magnetic Reynolds number calculated at the particular excitation frequency of use. In a relatively simple form, G=Xm/R2 for the induction machine, based upon conventional equivalent circuit parameters Xm (magnetizing reactance) and R2 (rotor resistance), is calculated according to the following equation:

$$G = \frac{2\tau_p^2 f t \mu_o}{g \pi P_r}$$

In this equation, $\tau_p$=pole-pitch, f=excitation frequency (Hz), t=thickness of rotor conductor shell or lumped cylindrical thickness when a distributed winding is rearranged into a continuous shell, g=radial airgap dimension, Pr=rotor electrical conductor resistivity, and μo=permeability of free space. Xm is the magnetizing reactance in Ohms at base frequency and R2 is the rotor resistance referred to the primary winding. G is dimensionless, and commonly referred to as a 'goodness factor'.

FIGS. 6A and 6B show the in-phase radial flux density waveform as Bp in the airgap of a high speed electrical machine and the corresponding quadrature flux density waveform as Bq. The space integral of each of these components with the stator current loading Js yields the airgap fundamental real power components according to the following equation:

$$P = \int_o^{n\tau P} B_{p(s)} J_s ds$$

$$Q = \int_o^{n\tau P} B_{q(s)} j s ds$$

In this equation, n=the number of poles, and $\tau_p$=pole pitch (m) at the airgap. Normally Js is a constant and not a function of peripheral position "s". Js is calculated as stator magneto-motive force (MMF) in ampere turns/slot divided by the slot pitch, TS, times the pitch or chording factor Kp according to the following equation:

$$J_s = [NI/\tau_s] \times \text{pitch factor } K_p$$

The component powers P and Q are mostly unrelated to leakage reactance or magnetizing reactance. P is the real power absorbed or generated in the electrical machine's airgap. Q is the reactive power generated or absorbed by the airgap magnetic field. If Q is positive, the airgap absorbs reactive power. If Q is negative, the airgap generates the re-occurring reactive power that is used to compensate for a combination of magnetizing requirements, leakage fields, and the remainder existing for special functions such as VAR correction, filtering, or inverter devices commutation for natural commutation mode. In one embodiment, the negative Q from the electrical machine is used to provide a quantity known as reverse recovery charge ($Q_{rr}$) that may be on the order to 250 to 7500 micro-Coulombs (uC) to effect commutation of large thyristor switching devices in an input or output converter.

When Q is positive, absorbing reactive power or energy into the electrical machine through the airgap magnetic field can also be used to enhance active filtering. The filter function of the stator winding means that the combination of rotor and stator serve to absorb harmonic energy of various incoming line or outgoing line harmonics, such as the 3rd, 5th, 7th, 11th, 13th harmonics of the fundamental frequency of the electrical machine. When the stator is wound to enhance the quantity Q, there may be multiple windings on the stator, which may be referred to as the primary and tertiary windings. Both the primary and tertiary windings may be polyphase windings electrically insulated from each other, and of different impedance levels.

FIG. 6A shows the normalized quadrature flux density Bq in a particular type of electrical induction machine in which Xm/R2=30 and having up to 9 poles in the primary winding. The electrical machine may be built with several "repeatable sections" such that each machine stator section can have an odd or even number of magnetic poles. In the most basic case the electrical machine may have two repeatable sections and overall even number of poles. The integral of Bq with current loading Js determines the terminal reactive power input (which may be positive or negative) after allowance for stator leakage reactance is made.

FIG. 6B shows the normalized in-phase flux density Bp in the electrical machine for the electrical machine as described with reference to FIG. 6A having a Goodness factor G. The integral of Bp with the current loading Js determines the input real power. The torque exerted on the flywheel energy storage apparatus is calculated as this input real power divided by the rotational speed in radians-per-second. Normalized flux density produces the most general representation of results. In both FIGS. 6A and 6B, the Bp or Bq quantity plotted is the actual flux density divided by the product of (Us/Pr Js) where Us is the rotor synchronous peripheral speed in meters per second (m/s), Pr is the rotor surface resistivity in Ohms, and Js is the current loading in Ampere-turns/meter periphery. Synchronous machines do not have these types of curves, therefore, a V-type excitation curve may be used.

Note that the electrical machine can have two direct axis windings and one or more quadrature axis windings with each winding group electrically isolated from the next group. Each winding group can be wound for a different impedance level and voltage level. What matters is the relative MMF or ampere turns of each winding; the ability of one winding group to control and regulate real power while the other winding group regulates reactive power to either a source or load may present new opportunities for AC to AC power conversion in some embodiments. For example, if an electrical machine configured with a kinetic energy storage device is provided having two primary (D-axis) windings delivering real power (one input, one output) and one quadrature (Q-axis) winding delivering or absorbing reactive power, this will yield good flexibility for many different applications.

In one embodiment, an electrical machine includes two main axis power windings and one quadrature (reactive) for controlling magnetic inside the electrical machine flux at various voltage and reactance levels. The electrical machine may be a cage-type induction machine due to its higher peripheral and rotational speed than a permanent magnet (PM) machine. Thus, the induction machine may therefore, operate a flywheel at higher frequencies with a relatively less sophisticated control system or without a position sensor. The main and quadrature axis windings may have different time constants. In one embodiment, the time constant of the quadrature winding is smaller than the time constant of the main D-axis winding.

Figure 7:
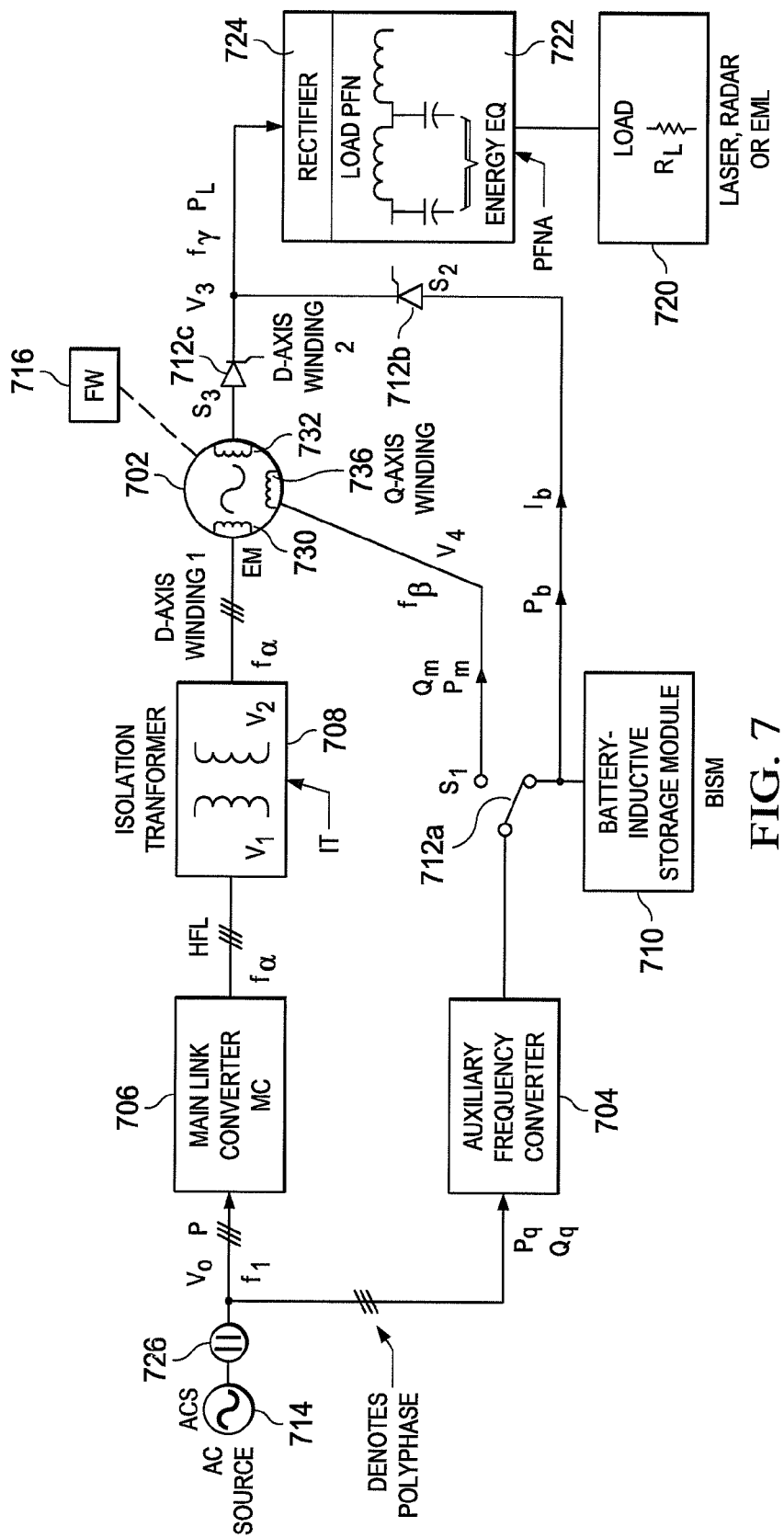
FIG. 7 illustrates an example electro-mechanical energy storage system according to another embodiment of the present disclosure.

FIG. 7 illustrates an example electro-mechanical energy storage system 700 according to another embodiment of the present disclosure. This particular embodiment may be applied to a high energy charging source for a pulsed power naval load and associated pulse forming network (PFN) serving as an input stage to the pulsed load. The load may constitute a pulsed laser, pulsed radar, or electromagnetic launcher, all of which are characterized by a short pulse of approximately 3 to 30 milli-seconds followed by a quiescent period or low level power. This embodiment provides for a multi-function power system having several features that are well suited for pulsed loads such as these. The input port operates at a low rate of rise of power (e.g., 1 Mega-Watt/second) and the output port operates at a high rate of rise of power (e.g. 20 Mega-watts/second).

The electro-mechanical energy storage system 700 includes an electro-mechanical kinetic energy storage device 702, an auxiliary frequency converter (AFC) 704 that are similar in design and construction to the electro-mechanical kinetic energy storage device 102, and AFC 120 of FIG. 1. The electro-mechanical energy storage system 700 also includes a main link converter (MC) 706 that is similar in design and construction to the IC 114, energy storage apparatus 116, and OC 118 of FIG. 1. The electro-mechanical energy storage system 700 differs from the electro-mechanical energy storage system 100 of FIG. 1, however, in that it also includes an isolation transformer (IT) 708 coupled between the MC 706 and the electro-mechanical kinetic energy storage device 702. The electro-mechanical energy storage system 700 also includes a battery-inductive storage module (BISM) 710 and three switches 712a, 712b, and 712c that will be described in detail below.

As stated previously, the elements of this embodiment may be well suited for pulsed loads, such as a pulsed laser, a pulsed radar, or electromagnetic launcher (railgun) that may use a relatively large amount of electrical energy in short bursts. Specifically, the electro-mechanical energy storage system 700 provides for the repetitive charging of energy storage elements in multiple stages. In certain embodiments, the multiple stage charging system may optimally utilize each energy storage element in a manner that optimizes the inherent capabilities of each storage element. For example, the BISM 710 includes a bank of batteries, which may be, for example, lithium-polymer storage cells. In many cases, this bank of batteries may be limited to store electrical energy at voltages of less than 1 Kilo-volts (KV) while the input power may be at 5 Kilovolts or higher.

Moreover, the preferred output may be at a preferred voltage of 10 KV or greater. Additionally, electro-mechanical kinetic energy storage devices, such as the electro-mechanical kinetic energy storage device 702 described herein often require several minutes to recharge to their nominal rotational speed of 30,000 revolutions-per-minute (rpm). In a discharge cycle, device 702 can discharge approximately one-half of its kinetic energy in less than ten seconds. In some embodiments, the nominal rotational speed of the electro-mechanical kinetic energy storage device 702 may be greater than 30,000 RPM or less than 30,000 RPM.

The electro-mechanical kinetic energy storage device 702 includes a flywheel 716 configured on its shaft to store the received electrical energy as mechanical energy when spun at high speeds. The MC 706 includes an AC resonant link bi-directional power converter that transforms AC power from the source 714 at frequency f1 into a link voltage V1 at higher frequency $f_\alpha$. The IT 708 is a polyphase step-up transformer that converts V1 potential to V2 potential, provides relatively high dielectric isolation, and directly feeds the electro-mechanical kinetic energy storage device 702 direct axis winding 730 to provide mostly real power with a smaller amount of reactive power. The frequency $f\alpha$ of V2 may be sufficiently high to operate the electro-mechanical kinetic energy storage device 702 at a high rotational speed, and therefore high energy density.

The switch 712a may selectively couple the AFC 704 to the electro-mechanical kinetic energy storage device 702 or BISM 710 to provide a multi-functional use. In one position of the switch 712a, the AFC 704 may be used to correct line harmonics and filter the MC 706 at its input. In this switch position, the AFC 704 may be fed from the electro-mechanical kinetic energy storage device 702 at frequency $f_\beta$ which is higher frequency than f1 and converts mainly reactive power Qm into a lower frequency f1. The reactive power Qm is generated by the quadrature axis winding 736 on the electro-mechanical kinetic energy storage device 702 and as such is a negative quantity whereby the electro-mechanical kinetic energy storage device 702 may act as either a synchronous condenser when configured as a synchronous machine or as an asynchronous condenser when constructed as an induction machine. Since the electro-mechanical kinetic energy storage device 702 may idle at a high speed for a relatively long period of time, the reactive power Qm may be useful for other ancillary regulation tasks providing that the reactive power Qm used does not substantially load the electro-mechanical kinetic energy storage device 702. In another position of switch 712a, the AFC 704 may be coupled to the BISM 710 for charging its battery bank. In this position, the internal gating of the AFC 704 may be adjusted to provide direct current (DC) output having a power Pq and negligible reactive power Qq. In this mode, an input line circuit breaker (CB) 726 may be open to decouple the electro-mechanical energy storage system 700 from the source 714. The electro-mechanical kinetic energy storage device 702 generates the battery source energy at a high voltage V2 and this is stepped down to V1 by the transformer IT 708. The action of both the MC 706 and the AFC 704 may further reduce the voltage applied to the BISM 710 to be commensurate with standard low voltage battery banks that may be included in the BISM. For example, the electro-mechanical kinetic energy storage device 702 may generate a voltage of approximately 15 kilo-volts, root-mean-squared (rms) while the BISM 710, composed of series and parallel battery cells, may be regulated at a more modest voltage, such as 1.5 kilo-volts (kV) DC. That is, the electro-mechanical energy storage system 700 may handle a difference in voltage potential from the electro-mechanical kinetic energy storage device 702 to the BISM 710 at a ratio of approximately 10:1, a level that may protect the components of the BISM 710 from overvoltage and limit the series string component count to industry standard practice in some embodiments.

The electro-mechanical energy storage system 700 may provide relatively high galvanic isolation of the high voltage PFN 722 to the source 714 by virtue of two main subsystems, namely the IT 708 and the electro-mechanical kinetic energy storage device 702 that has its windings electrically isolated from one another. In a typical embodiment, the electro-mechanical kinetic energy storage device 702 may be designed to have 50 kV isolation and the IT 708 may be designed to have 100 kV isolation. In the event of a semiconductor switch failure in either MC, AFC, or rectifier R, the source is protected against high voltage transients generated in the PFN or load. This may be important in cases where the source may be driving other loads having sensitive communication devices or telemetry command equipment which may not be able to tolerate high voltage or high energy transients generated by the PFN.

The electro-mechanical energy storage system 700 may also provide excellent electrical noise rejection and input power factor correction as well as filtering of line harmonics since both the MC 706 and the AFC 704 are AC resonant link converters. The voltage output V4 of quadrature winding 736 is chosen to allow VAR flow from the electro-mechanical kinetic energy storage device 702 back to the source 714 thru the AFC 704; the voltage V4 being higher than Vo by, for example, approximately 20 percent, to allow for efficient VAR regulation. The electro-mechanical kinetic energy storage device 702 has different levels of terminal voltage amongst its windings; however the most important parameter is the ampere-turns or magneto-motive force (MMF). In certain embodiments, the MMF of the input port of the electro-mechanical kinetic energy storage device 702 may be 1.0 per unit, at frequency fα, the MMF of the output port of direct axis winding 732 of the electro-mechanical kinetic energy storage device 702 may be 1.0 per unit, at frequency fγ, and the MMF of the quadrature winding 736 of the electro-mechanical kinetic energy storage device 702 may be 0.20 per unit, at frequency fβ. In a general case, fα=fβ=fγ; however with a multi-wound stator machine, each winding may have a distinct pole pitch and distinct output frequency if the electro-mechanical kinetic energy storage device 702 is a synchronous machine with separate magnetic circuits. In one embodiment, the input port is selected to have fα as base frequency, the output port is selected to have fγ=½ fα, and the quadrature port is selected to have fβ=½ fα.

If the electrical machine is a solid-rotor induction machine with a common stator core with three distinct windings, all three output frequencies may be configured to have the same frequency regardless of the pole-pitch of each winding since they share a common rotor flux (i.e., fα=fβ=fγ=V/2τp where τp is the pole-pitch and V is the velocity of the airgap field speed). In one embodiment, the airgap field speed may be maximized and rotation speed may be maximized for optimizing the flywheel energy density. For example if the electro-mechanical kinetic energy storage device 702 can operate its electrical machine rotor at a 200 meters-per-second (m/s) peripheral speed and the flywheel is fully charged at its peripheral speed of 800 m/s, due to its inherently larger outer diameter, the result is an electro-mechanical kinetic energy storage device 702 that allows the IT 708 to be relatively compact in that the magnetic material in its core is reduced by the use of high frequency. The number of poles for the electro-mechanical kinetic energy storage device 702 may be a fraction of power/energy output and stator base diameter, with one embodiment having in the range of 4 to 28 stator poles. For example a 4-pole induction machine excited at fγ=1040 Hz input frequency yields a 30,000 rpm shaft speed, which may be an ideal shaft speed for a high energy density composite flywheel.

For an example, if the electro-mechanical kinetic energy storage device 702 has 20 poles and is excited at 800 to 1040 Hz as the base frequency on it input port, the rotational speed may be approximately be 5000 to 6000 rpm which is appropriate for a medium density energy storage flywheel configured on the electro-mechanical kinetic energy storage device 702. In this particular example, the output port and quadrature port may have output electrical frequencies of approximately 400 to 520 Hz. This range of frequencies allows compact power conversion filtering and permits use of large thyristors or IGBTs with compact switching frequency limitations under 600 Hz.

In certain embodiments, the electro-mechanical energy storage system 700 may be operated at a relatively wide range of voltages to provide a compact and efficient source of power for a PFN that serves to sharpen high-voltage, high-power waveforms for pulsed loads, such as a railgun. An one example, the electro-mechanical energy storage system 700 may operate with a 4160 volt three-phase AC source 714 such that the MC 706 may generates a 4500 volt, three-phase output, the IT 708 generates a 15,000 volt three-phase AC output, the output port of the electro-mechanical kinetic energy storage device 702 generates after rectification, a 100,000 volt DC output, the quadrature port of the electro-mechanical kinetic energy storage device 702 generates a 5,000 volt, three-phase output, and the BISM 710 provides 1.5 kilo-volts in a constant current mode.

The electro-mechanical energy storage system 700 as shown in FIG. 7 may be practical for a wound-field synchronous machine with multiple output windings (e.g. one stator winding on the direct axis and one stator winding on the quadrature axis). These output windings may be different or same reactance and voltage levels. FIG. 7 shows an electro-mechanical kinetic energy storage device 702 with two D-axis windings (D1 and D2) and one Q-axis winding (Q1) arranged as one input port and two output ports. The electro-mechanical kinetic energy storage device 702 may be a wound-field synchronous machine whereby two separate output loads such as a pulse forming network (PFN) and a battery energy storage system may be fed while retaining the ability of discharging energy back from the PFN at a relatively fast rate. In a large synchronous machine, the inherent inertia of the rotor may be sufficient in magnitude to obviate the need for a flywheel. This disclosure describes embodiments having multiple input ports feeding one electrical machine with multiple output ports in which each port may operate at a different voltage and reactance level to suit a particular application. Table 1 shows an example of a 4 port synchronous wound-field synchronous machine that may be used with the electro-magnetic energy storage systems described above. The example four port synchronous machine has 4 Voltage levels and 4 reactance levels with bi-directional energy flow among all 4 windings. The reactances shown are transient reactances.

TABLE 1

Parameters of an Example Four Port Synchronous Machine.

| | |
|---|---|
| Input Port 1: D-axis Winding No. 1 (W1) | 4160 Volts, 3 phase from Grid source |
| Input Port 2: D-axis Winding No. 2 (W2) | 480 Volts, 3 phase from main generator source at 2000 Hz |
| Output Port 1: D-axis Winding No. 3 (W3) | 10,000 Volts, 3 phase with external rectification to high voltage pulse forming network for directe energy device at 13.5 kV |
| Output Port 2: Q-Axis Winding No. 4 (W4) | 750 Volts, 3 phase for rectification and charging of battery energy storage load at 1000 VDC. |
| Reactance: W1: 50 Ohms | Reactance: W3: 120 Ohms |
| Reactance: W2: 5.77 Ohms | Reactance: W4: 9.0 Ohms |
| Open Circuit Time Constant: 1.5 sec. for all windings | Machine Poles: 12 |
| Machine Frequency at 20,000 RPM Base: 2000 Hz | Energy Transfer Rate: 2 MW/s |

As shown in Table 1, it may be practical to have two D-axis stator windings as input ports and one D-axis and one Q-axis windings as an output port. The particular example describes a 12 pole electrical machine configured to operate at 20,000 rpm and 2000 Hz frequency with a flywheel directly attached to the shaft of the electrical machine. The example shows an energy transfer slew rate of 2 Megawatts/second (MW/s) which may indicate how fast the electrical machine can transfer power from one port to another without exceeding limits on induced voltage in the windings. This four port electrical machine may have input ports that operate at 4160 Volt and 480 Volt, three-phase AC and output ports that operate at 10,000 Volt and 750 volt AC for feeding different loads that, in certain cases, may permit output voltage rectification. Many loads use DC electrical power whereby a solid-state rectification apparatus may be used to convert AC power to DC power. In certain embodiments, the system may be bi-directional in power and energy flow.

Figure 8:
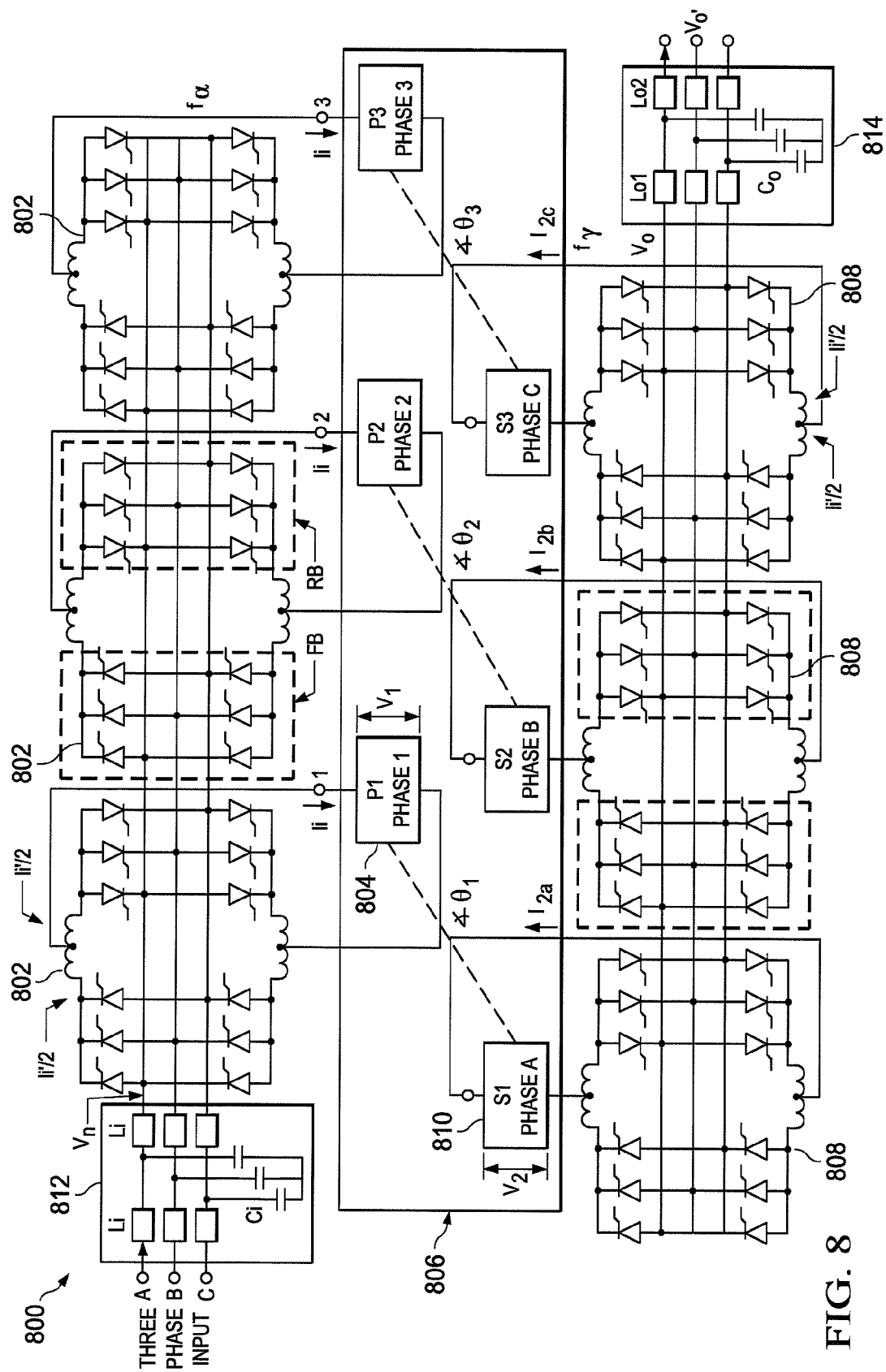
FIG. 8 illustrates an example electro-mechanical energy storage system according to another embodiment of the present disclosure.

FIG. 8 illustrates an example electro-mechanical energy storage system 800 according to another embodiment of the present disclosure. The electro-mechanical energy storage system 800 includes three six-pulse input cycloconverters 802 coupled to a corresponding three input ports 804 of a three-phase electro-mechanical kinetic energy storage device 806. The electro-mechanical energy storage system 800 also includes three six-pulse output cycloconverters 808 coupled to a corresponding three output ports 810 of the electro-mechanical kinetic energy storage device 806. Each input port 804 and output port 810 of the electro-mechanical kinetic energy storage device 806 includes a polyphase winding having relatively high voltage isolation and different reactances relative to one another. The magnetic coupling of each input port 804 relative to one another and each output port 810 relative to one another may be configured to have nominal magnetic coupling. However, the magnetic coupling from the input ports 804 relative to the output ports 810 may be configured to have a controllable phase shift angle θ. The main magnetic coupling for all ports is to the rotor magnetic circuit. This configuration may provide energy storage, voltage transformation, relatively good isolation, and adjustable phase shift of the input to output waveforms. In this particular embodiment, the ratio of input frequency f1 to output frequency f2 may not be constrained as is typical in conventional cycloconverters.

The electro-mechanical energy storage system 800 may include an input T-filter 812 configured on its input line and an output T-filter 814 configured on its output line. In other embodiments, the electro-mechanical energy storage system 800 may include an input Pi-filter configured on its input line and an output Pi-filter configured on its output line. In either case, an electro-mechanical energy storage system 800 configured with T-filters or Pi-filters may be useful for reducing harmonics generated by the cycloconverters 802 and 808 or the electro-mechanical kinetic energy storage device 806. Additionally, the switching devices may include naturally commutated thyristors which are well suited for high voltage, high power applications. The electrical machine may or may not incorporate flywheel energy storage device external to the electrical machine to provide inertia for the electro-mechanical kinetic energy storage device 806. In one embodiment, the stored energy of the ES exceeds the required output pulse energy by a multiple factor depending on the load repetition rate.

The electro-mechanical energy storage system 800 may utilize both synchronous machines and brushless induction machines and is appropriate for larger power machines and power conversion techniques. The configuration as shown may be well suited for high power conversion in the multi-megawatt range that operates with a relatively high power to size density. One may note that there are no electrostatic capacitors in the cycloconverters 802 and 808 or electro-mechanical kinetic energy storage device 806. The only capacitors shown in this system are the filter capacitors in the Input T-filter and Output T-filter. In some embodiments, the cycloconverters 802 and 808 or electro-mechanical kinetic energy storage device 806 may each include one or more capacitors to improve for various purposes, such as noise reduction internal to the electro-mechanical kinetic energy storage device 806 or dampening of transient voltages that may be present across the terminal of the active elements of the cycloconverters 802 and 808. Capacitors do not form the primary means of energy storage in this invention.

The electro-mechanical energy storage system 800 as shown in FIG. 8 having twelve units of a six pulse bridge can be applied to a wound-field synchronous machine whereby each winding in each port is wound as an isolated delta winding and each winding segment has a twelve device dual converter that may be configured in parallel to produce one three-phase output. The electro-mechanical kinetic energy storage device 806 may be used for large scale energy storage where relatively high galvanic isolation from its input to its output is maintained and the electro-mechanical kinetic energy storage device's electrical machine leakage and differential reactance is used in a resonant circuit to comprise the main resonant inductance. In one embodiment, the electro-mechanical kinetic energy storage device 806 may be run continuously in the transient state such that rotor damper bar currents are established on a continuous basis and the electro-mechanical kinetic energy storage device's main stator reactances comprise the transient reactances Xd' and Xq'. In another embodiment, the electro-mechanical energy storage device winding's line to line capacitances are designed within certain limits in order to resonate with the winding inductance. In doing so, the windings may establish distinct resonant frequencies for operation of the AC resonant link power conversion which may use naturally commutated switching devices and efficient mutual coupling from primary to secondary winding.

Although the FIGURES described above show several electro-magnetic energy storage systems 100, 300, 700, and 800, various changes may be made. For example, the electro-mechanical energy storage system 100 may be configured to operate with any suitable type of electrical source, such as a one-phase AC source, a three-phase AC source, or a six-phase AC source. As another example, although the tertiary port of the electrical machine has been shown to have a power of approximately 20 percent of the power rating of the main port, other embodiments may include a tertiary port having any power rating relative to the main port. As another example, the IC, ES, and OC coupled to the main port may be configured to generate any voltage level suitable for use by the electro-mechanical energy storage system. Additionally, the electro-mechanical energy storage device may include any number and type of tertiary windings for various purposes, such as power factor correction, load balancing, ancillary power generation, and the like. Load balancing applies to an application whereby multiple loads must be powered simultaneously from a common energy storage device with multiple output ports and a balance of delivered energy.

Figure 9:
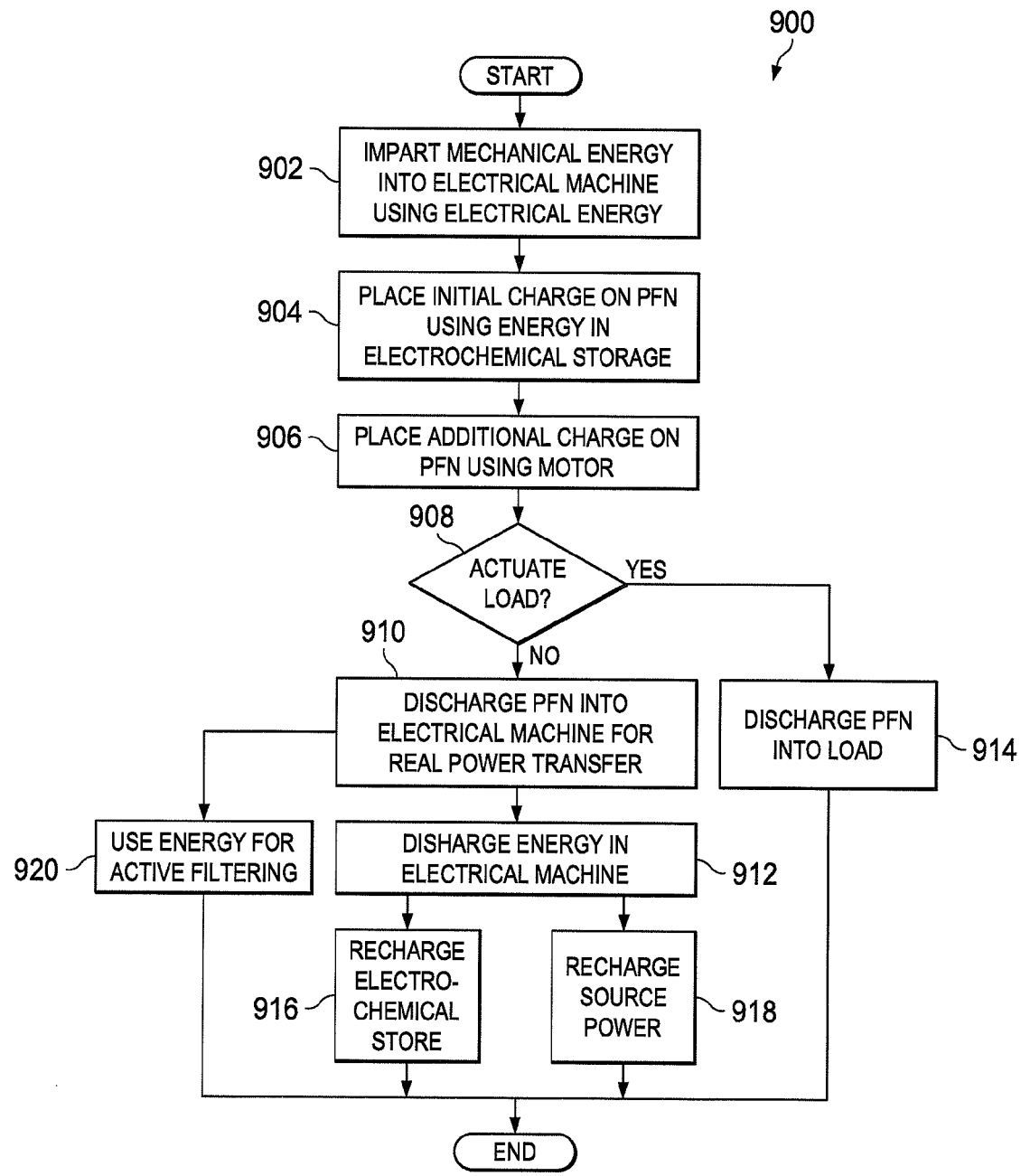
FIG. 9 illustrates an example method for using the electro-mechanical energy storage system according to one embodiment of the present disclosure.

FIG. 9 illustrates an example method 900 for using the electro-mechanical energy storage system according to one embodiment of the present disclosure. For ease of explanation, the method 900 is described with respect to the electro-mechanical energy storage system 700 of FIG. 7. However, the method 900 could also be used with either electro-mechanical kinetic energy storage device 100, 300, 800, or any other electrical machine configured to store received electrical energy as mechanical energy for providing a short duration pulse having a relatively high level of energy. The operation of the electrical machine is bi-directional and capable of receiving pulses of energy in a fast discharge mode from the load.

In step 902, electrical energy is supplied from an electrical source 714 to impart mechanical energy into the electro-mechanical kinetic energy storage device 702 by increasing the speed of a shaft of the electro-mechanical kinetic energy storage device 702. In one embodiment, the electro-mechanical kinetic energy storage device 702 includes a flywheel 716 that is configured to spin at approximately 30,000 rpm. In one embodiment, the energy stored in the flywheel of the electro-mechanical kinetic energy storage device 702 may exceed the energy storage or energy usage of both a load 720 and a PFN 722 by a factor of at least 2:1, thus allowing for the generation of multiple pulse output operations of the load 720 from one charging cycle of the MC 706. The electro-mechanical kinetic energy storage device 702 decreases in shaft speed after each firing operation until a lower energy threshold is reached, whereby additional source energy must be drawn through the input port or source 714 to recharge the electro-mechanical kinetic energy storage device 702.

In step 904, the storage elements in the PFN 722 may be initially charged by the BISM 710. That is, the PFN 722 may receive an initial electrical charge via a constant current electric supply indicated by power Pb and current Ib when enabled by the solid-state switch 712b. In certain embodiments, this charging stage may be useful for transferring energy from a source of power, such as an electro-chemical battery bank to the PFN 722 in an efficient manner. The BISM 710 may be implemented to temporarily store electrical energy for various reasons including off-loading an electrical charge from the PFN 722 due to an abort operation as will be described in detail below. Thus, the BISM 710 may improve the efficiency and flexibility of the electro-mechanical energy storage system 700. In other embodiments, the BISM 710 may be eliminated such that the PFN 722 may be charged from the electro-mechanical kinetic energy storage device 702 with no initial charge from a electro-chemical storage system.

In step 906, the storage elements of the PFN 722 are further charged via the output port of the electro-mechanical kinetic energy storage device 702. In this particular step, the electro-mechanical kinetic energy storage device 702 may apply electrical voltage V3 at constant power PL to the PFN 722 by turning off switch 712b to decoupled the BISM 710 from the PFN 722, and turning on switch 712c to couple the electro-mechanical kinetic energy storage device 702 to the PFN 722 through a main axis winding configured on the electro-mechanical kinetic energy storage device 702. The voltage V3 may be rectified by a polyphase rectifier 724, which is integral to the PFN 722. Consequently, there is both constant current and constant power charging/discharge modes.

In step 908, it is determined whether to actuate or discharge the load using the energy stored in the PFN 722. In many cases, the storage elements of the PFN 722, such as its capacitors, may be rated for storage of an electrical charge for a relatively short time, which in some embodiments may be on the order of approximately 10 seconds or less. Thus, if use of the charge stored in the PFN 722 is aborted for any reason, this charge may be depleted in order to preserve the integrity and lifetime of the capacitors of the PFN 722.

In step 910, if actuation of the load is aborted, the storage elements of the PFN 722 may be discharged. As described above, capacitors in the PFN 722 may be rated for storing an electrical charge for a relatively short period of time (e.g. 10 seconds). On the other hand, the flywheel on the electro-mechanical kinetic energy storage device 702 may be able to store energy for a relatively long period of time (e.g. several hours). Thus in certain embodiments, the energy in the PFN 722 may be discharged into the electro-mechanical kinetic energy storage device 702 if not used by the load 720 within a specified period of time. This is an important and ever present safety feature.

In step 912, the newly stored energy in the electro-mechanical kinetic energy storage device 702 may be discharged in any one or more devices. In one embodiment, the energy stored in the electro-mechanical kinetic energy storage device 702 may be discharged into the BISM 710 through the IT 708, MC 706, and AFC 704 at a charging rate appropriate for the maximum recommended battery charging rate. In this manner high overcurrent levels and excessive heating caused by over-charging the BISM 710 may be avoided. In another embodiment, the energy stored in the electro-mechanical kinetic energy storage device 702 may be discharged back into the electrical source 714. The electrical source 714 may generally include a single or an array of turbine generators along with various loads that use the generated electrical energy. The discharge of the electro-mechanical kinetic energy storage device 702 into the source 714 may be controlled in a manner to slowly parcel out energy from the electro-mechanical kinetic energy storage device 702. In a typical turbine generator source the regenerative energy is usually limited to under 10 percent of the generator's rating by design. Thus, temporarily storing the discharged energy in the electro-mechanical kinetic energy storage device 702 may allow the energy to be transferred back into the source in a manner that does not damage the source or any other loads coupled to the source in some embodiments. The device 702 effectively controls the transfer rate to established limits independent of how fast the main load is discharged.

If, however, it is determined to use the energy stored in the PFN 722 to actuate the load, the PFN 722 is discharged through the load 720 at step 914. In some embodiments, the energy is supplied as a relatively short pulse burst that ranges from typically 3 to 30 milli-seconds in length. Relatively short pulse bursts such as these may be ideally suited for loads such as pulsed radars, railguns, and pulsed laser devices. Device 702 controls its output discharge rate to be within established limits for the load.

The previously described steps may be repeated any number of time to actuate the load in an ongoing, recurring manner. When use of the electro-mechanical energy storage system 700 is no longer needed or desired, the method ends.

Although FIG. 9 illustrates one example of a process 900 for supplying short duration pulses to a load, various changes may be made to FIG. 9. For example, while shown as a series of steps, various steps in FIG. 4 could overlap, occur in parallel, occur in a different order, or occur multiple times.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An electro-mechanical kinetic energy storage device comprising:
   an input port configured to receive a first input electrical energy from a first electrical component to induce at least a first portion of mechanical energy in the electro-mechanical kinetic energy storage device;
   an output port configured to output a first converted electrical energy to a first load;
   a tertiary port electrically separate from and magnetically coupled to the input port and the output port, the tertiary port configured to:
      receive a second input electrical energy from a second electrical component to induce at least a second portion of the mechanical energy in the electro-mechanical kinetic energy storage device; and
      output a second converted electrical energy to a second load;
   a flywheel coupled to a shaft of an electrical machine, the flywheel configured to store the mechanical energy;
   a first electrical winding set coupled to the input port;
   a second electrical winding set coupled to the output port; and
   a tertiary electrical winding set coupled to the tertiary port, the tertiary electrical winding set configured to produce time quadrature alternating currents relative to the first and second electrical winding sets;
   wherein the electro-mechanical kinetic energy storage device is configured to generate the first converted electrical energy and the second converted electrical energy from the induced mechanical energy.

2. The electro-mechanical kinetic energy storage device of claim 1, wherein the electrical machine comprises an induction machine.

3. The electro-mechanical kinetic energy storage device of claim 1, wherein the tertiary port is configured to receive the second input electrical energy at a specified frequency and a nominal current level that is different from a frequency and a nominal current level at which the first input electrical energy is received by the input port.

4. The electro-mechanical kinetic energy storage device of claim 1, wherein:
   the first converted electrical energy comprises a short duration pulse that is configured to power the first load; and
   the first load comprises one or more of:
      a pulsed laser device;
      an electro-magnetic launcher;
      a pulsed radar device;
      a device having an intermittent power input; and
      a device configured to intermittently provide regenerative power.

5. The electro-mechanical kinetic energy storage device of claim 1, wherein the second electrical component comprises a frequency converter configured to convert a portion of the first input electrical energy into the second input electrical energy having an electrical frequency of operation different from that of the first input electrical energy.

6. An electro-mechanical kinetic energy storage device comprising:
   an input port configured to receive a first input electrical energy from a first electrical component to induce at least a first portion of mechanical energy in the electro-mechanical kinetic energy storage device;
   an output port configured to output a first converted electrical energy to a first load; and
   a tertiary port electrically separate from and magnetically coupled to the input port and the output port, the tertiary port configured to:
      receive a second input electrical energy from a second electrical component to induce at least a second portion of the mechanical energy in the electro-mechanical kinetic energy storage device; and
      output a second converted electrical energy to a second load;
   wherein the electro-mechanical kinetic energy storage device is configured to generate the first converted electrical energy and the second converted electrical energy from the induced mechanical energy;
   wherein the output port is coupled to the first load through a pulse forming network comprising one or more capacitor/inductor combinations; and
   wherein the second load comprises an electro-chemical storage battery that is configured to pre-charge the capacitors in the pulse forming network in a different time period from the first load.

7. The electro-mechanical kinetic energy storage device of claim 6, further comprising:
   a bi-directional switch configured to selectively couple the tertiary port to the electro-chemical storage battery or to the second electrical component.

8. The electro-mechanical kinetic energy storage device of claim 6, wherein the first converted electrical energy comprises a short duration pulse that is configured to power the first load.

9. A method comprising:
   inducing at least a first portion of mechanical energy into an electrical machine using a first input electrical energy from a first electrical component;
   inducing at least a second portion of the mechanical energy into the electrical machine using a second input electrical energy from a second electrical component;
   converting the induced mechanical energy to a first converted electrical energy and a second converted electrical energy;
   temporarily storing the first converted electrical energy in a pulse forming network by charging one or more electrical storage elements of the pulse forming network at a controlled rate;

outputting the first converted electrical energy to a first load, the first converted electrical energy comprising a short duration pulse; and outputting the second converted electrical energy to a second load.

10. The method of claim 9, further comprising:

charging an electro-chemical storage apparatus using the second input electrical energy from the second electrical component; and initially charging the one or more electrical storage elements using the electro-chemical storage apparatus prior to charging one or more capacitive or inductive storage elements of the pulse forming network using the first converted electrical energy.

11. The method of claim 9, wherein the first converted electrical energy comprises a short duration pulse that is configured to power the first load.

12. The method of claim 10, further comprising:

discharging the one or more electrical storage elements by charging the electro-chemical storage apparatus using the energy in the one or more electrical storage elements.

13. The method of claim 10, further comprising:

discharging the one or more electrical storage elements by inducing additional mechanical energy into the electrical machine using the energy in the one or more electrical storage elements.

14. The method of claim 13, further comprising:

converting the additional mechanical energy back into the first input electrical energy that regenerates power to an input of the electrical machine.

15. The method of claim 13, further comprising:

converting the additional mechanical energy back into the first input electrical energy that regenerates reactive power to an input of the electrical machine through a separate output port of the electrical machine.

16. An electro-mechanical kinetic energy storage device comprising:

an electrical machine comprising:

an input port configured to receive a first input electrical energy from a first electrical component to induce at least a first portion of mechanical energy in the electrical machine;

an output port configured to output a first converted electrical energy to a first load; and a tertiary port configured to:

receive a second input electrical energy from a second electrical component to induce at least a second portion of the mechanical energy in the electrical machine; and output a second converted electrical energy to a second load;

a flywheel coupled to a shaft of the electrical machine, the flywheel configured to store the mechanical energy;

a first electrical winding set coupled to the input port;

a second electrical winding set coupled to the output port; and a tertiary electrical winding set coupled to the tertiary port, the tertiary electrical winding set configured to produce time quadrature alternating currents relative to the first and second electrical winding sets;

wherein the electrical machine is configured to generate the first converted electrical energy and the second converted electrical energy from the induced mechanical energy.

17. The electro-mechanical kinetic energy storage device of claim 16, wherein the tertiary port is configured to receive the second input electrical energy at a specified frequency and a nominal current level that is different from a frequency and a nominal current level at which the first input electrical energy is received by the input port.

18. The electro-mechanical kinetic energy storage device of claim 16, wherein the electrical machine comprises an induction machine.

19. The electro-mechanical kinetic energy storage device of claim 16, wherein the first converted electrical energy comprises a short duration pulse that is configured to power the first load.

20. The electro-mechanical kinetic energy storage device of claim 16, wherein the second electrical component comprises a frequency converter configured to convert a portion of the first input electrical energy into the second input electrical energy having an electrical frequency of operation different from that of the first input electrical energy.

* * * * *